United States Patent
Gruver, III et al.

[11] Patent Number: 6,139,026
[45] Date of Patent: Oct. 31, 2000

[54] STABILIZED "O" RING GASKET SEAL

[75] Inventors: Morris E. Gruver, III, Rochester; Franklyn J. Amorese, Hilton; Eugene A. Priebe, Rochester, all of N.Y.

[73] Assignee: Pfaudler, Inc., Rochester, N.Y.

[21] Appl. No.: 09/276,199

[22] Filed: Mar. 25, 1999

[51] Int. Cl.$^7$ ............................................. F16L 17/06
[52] U.S. Cl. ..................... 277/608; 277/626; 277/627; 277/652; 277/654; 277/905; 277/910
[58] Field of Search ................................. 277/608, 626, 277/627, 641, 644, 650, 652, 651, 654, 910, 905

[56] References Cited

U.S. PATENT DOCUMENTS

| | | |
|---|---|---|
| 494,402 | 3/1893 | Walsh . |
| 2,823,058 | 2/1958 | Ecker et al. . |
| 4,081,083 | 3/1978 | Glauser et al. ............................ 213/76 |
| 4,331,338 | 5/1982 | Caldwell et al. . |
| 4,913,951 | 4/1990 | Pitolaj ........................................ 428/76 |
| 5,556,113 | 9/1996 | Amorese et al. . |

*Primary Examiner*—Anthony Knight
*Assistant Examiner*—Alison K. Pickard
*Attorney, Agent, or Firm*—Michael L. Dunn

[57] ABSTRACT

A sealing gasket for sealing a flange face, especially a flange face that may be sensitive to uneven application of pressure or that cannot be provided with any sort of flange retaining means comprising a sharp angle in the flange surface. The gasket includes at least a metal ring, a reinforced fluoropolymer sheet, an O ring and a fluoropolymer protective shield. The metal ring is defined by inside and outside circumferences, by widely separated outwardly directed parallel surfaces that in turn define maximum thickness of the ring, by narrowly separated parallel surfaces defining opposing depressed portions in the ring and by opposing shoulders. Each of the widely separated parallel surfaces is covered by at least one reinforced fluoropolymer sheet having inside and outside surfaces positioned so that the inside surface of the sheet faces and covers at least one of the widely separated parallel surfaces and so that the outside surface faces outwardly. The gasket includes at least two O rings. The O rings have outside ring diameters about equal to a diameter of the shoulder, i.e. the distance from the shoulder to shoulder across the center of the metal ring. The O rings have thicknesses that are sufficient to extend beyond the outside surface of the reinforced fluoropolymer sheet. The narrowly separated parallel surfaces, the interior circumference, and the outside surface of the fluoropolymer sheets are covered by a fluoropolymer protective shield to further increase resistance to corrosive compounds.

14 Claims, 4 Drawing Sheets

STABILIZED "O" RING GASKET SEAL

BACKGROUND OF THE INVENTION

This invention relates to seals, especially for flange connections and even more especially for connections between glass lined flanges.

Gaskets for sealing flanges together are well known in the art. Unfortunately, readily removable and cost effective gaskets for sealing flange faces have not been as good as desired, especially when the flange faces have been glass coated and surround openings in vessels or conduits having corrosive contents that are under pressure, e.g. 300 psi (about 20 atmospheres) or higher. Under such conditions, seals between flange faces have often been known to leak or even blow out. Further, such known gaskets require high seating loads that can cause glass lining failures. Such seals also require a large number of clamps or bolts in a uniform distribution around the seal area in order to maintain the high loads required.

Known seals, for glass and other smooth surfaces, generally use gaskets having flat surfaces that can seal at almost any location on the surface. Such seals are not as sanitary as desirable for pharmaceutical and food applications because of cracks at the edge of the contact areas between the sealing flange and gasket that can harbor contamination because the actual seal may be formed at another location on the flat gasket surface.

It has been known to use O-rings to form seals between flange faces; however, to prevent "blowout", grooves have been needed in the flange faces in order to position and retain the O-rings, especially when any significant pressure is involved. In the case of glass lined flange faces, such grooves cannot practically be used because the glass tends to crack at the sharp bends needed to form the grooves.

The use of a polytetrafluoroethylene (PTFE) ring gasket to provide supplemental support for an O-ring has been considered; however, PTFE does not have sufficient dimensional stability either to retain the O-ring against radial blow out or to retain a dimensionally stable groove to hold the O-ring.

In response to the above problems, an O-ring envelope gasket was invented and awarded U.S. Pat. No. 5,556,113. This gasket is provided with a fluoropolymer protective sheet that covers, protects and retains an O-ring supported by a reinforcing ring comprising a metal strip between compressible layers. The metal ring in this gasket provides significant resistance to radial deformation or rupture ("blow out"). While gaskets, as described in U.S. Pat. No. 5,556,113, are an improvement over prior gaskets for sealing glass coated flanges, they are complex to manufacture. Furthermore, the metal supporting ring and compressible layers may not have sufficient corrosion resistance to withstand attack by the contents of the container in the event that the relatively thin protective sheet is breached. It is therefore an object of the present invention to eliminate or reduce the above described problems and disadvantages associated with prior sealing gaskets for flanges, especially glass lined flanges.

BRIEF DESCRIPTION OF THE INVENTION

Figure 1:
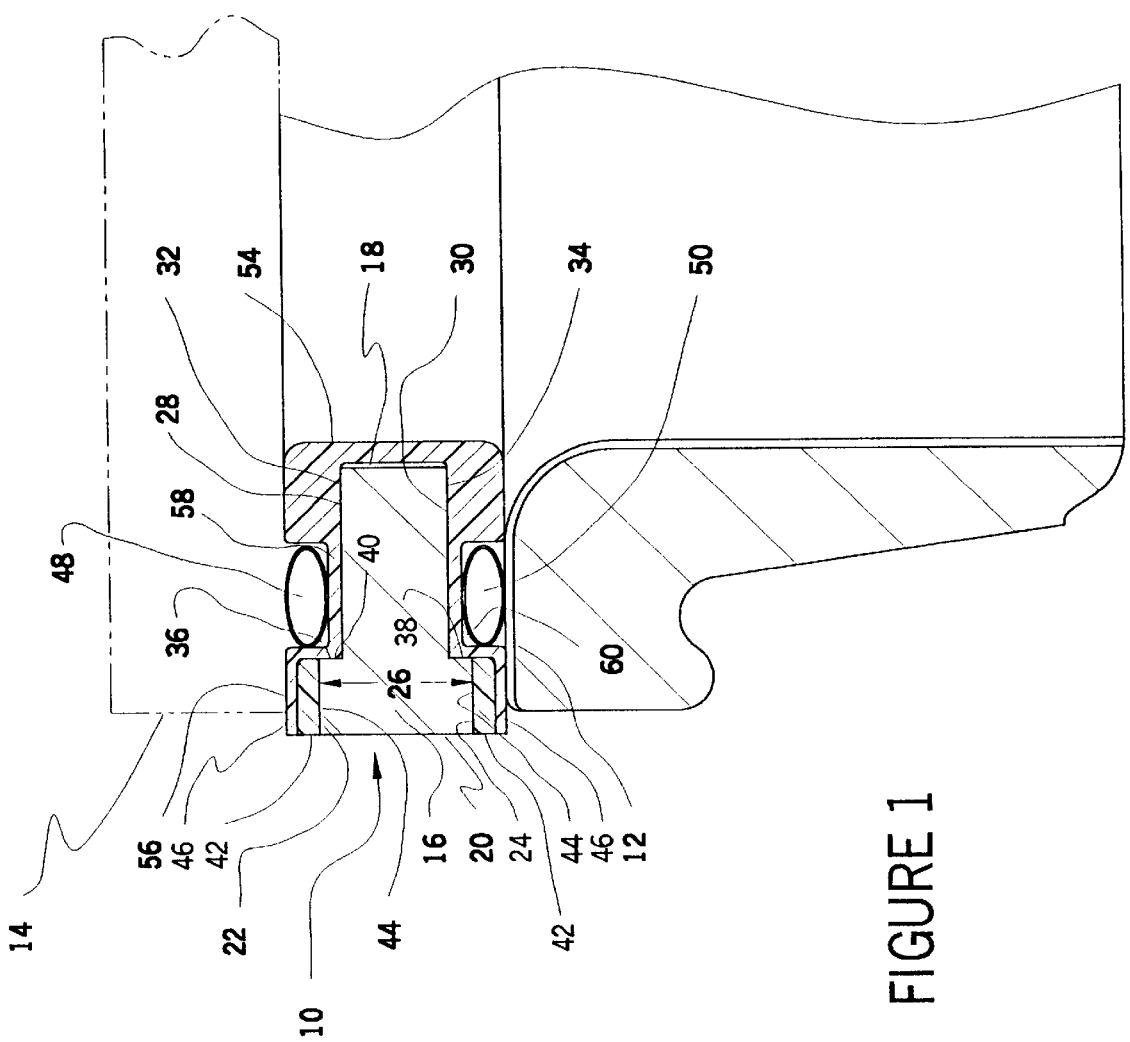
FIG. 1 shows an embodiment of the stabilized O-ring gasket seal of the invention, provided with a PTFE protective shield that is grooved to retain the O-ring.

The invention comprises a sealing gasket for sealing a flange face, especially flange faces that may be sensitive to uneven application of pressure or that cannot be provided with any sort of flange retaining means comprising a sharp angle in the flange surface. The gasket includes at least a metal ring, a reinforced fluoropolymer sheet, an O ring and a fluoropolymer protective shield. The metal ring is defined by inside and outside circumferences, by widely separated outwardly directed parallel surfaces that in turn define maximum thickness of the ring, by narrowly separated parallel surfaces defining opposing depressed portions in the ring and by opposing shoulders. Each of the shoulders connects one of the widely separated parallel surfaces to one of the narrowly separated parallel surfaces and each shoulder is perpendicular to the parallel surfaces and has a surface that faces the inside circumference. Each of the widely separated parallel surfaces is covered by at least one reinforced fluoropolymer sheet having inside and outside surfaces positioned so that the inside surface of the sheet faces and covers at least one of the widely separated parallel surfaces and so that the outside surface faces outwardly.

Usually, two separate reinforced fluoropolymer sheets are provided, one of which covers one of the widely separated surfaces and the other of which covers the other widely separated surface.

The gasket includes at least two O rings. The O rings have outside ring diameters about equal to a diameter of the shoulder, i.e. the distance from shoulder to shoulder across the center of the metal ring. The O rings have thicknesses that are sufficient to extend beyond the outside surface of the reinforced fluoropolymer sheet when each O ring is positioned so that it is at least partly within one of the parallel depressed portions, and so that the outside diameter of the O ring is proximate to and stabilized by the face of a shoulder.

The narrowly separated parallel surfaces, the interior circumference, and the outside surface of the fluoropolymer sheets are preferably covered by a contiguous fluoropolymer protective shield to further increase resistance to corrosive compounds. The shield may be a film of uniform thickness or may have a variable thickness as might be obtained by molding to a desired pattern.

The fluoropolymer protective shield, at a minimum, preferably covers the outside surface of the at least one reinforced fluoropolymer sheet, the narrowly separated parallel surfaces and the inside circumference of the metal ring. In such a configuration, the fluoropolymer shield may at least partially follow a contour of the depressed portions in the metal ring so that depressed portions are present in the outside surface of the fluoropolymer sheet to permit the O rings to be placed at least partly within the depressed portions of both the metal ring and fluoropolymer shield. Optionally, the fluoropolymer protective shield may also cover the O ring.

The various above described embodiments of the gasket of the invention, when compressed between a flange and a flange cover or connection, provides a pressure resistant and corrosion resistant seal, even when the gasket is applied to smooth glass lined flange surfaces.

DETAILED DESCRIPTION OF THE INVENTION

The metal ring used in the gasket of the invention provides significant strength against radial blow out. This is true because pressure from inside of a closed vessel applied to the metal ring is almost always applied uniformly around the inside circumference of the metal ring which would require that the force expand the circumference of the ring and stretch the ring to its break point before the ring could be breached. The internal pressure is thus resisted by the tensile strength of the metal of the ring. The metal of the ring is thus selected on the basis of its tensile strength and often also on the basis of corrosion resistance. When the metal ring is entirely covered at surfaces exposed to corrosive materials, the steel ring may simply comprise carbon steel which can have a tensile strength of from about 65,000 to about 90,000 pounds per square inch depending upon processing conditions and quantity of carbon, manganese, and silicon in the steel. Unless cost is a significant consideration, the metal ring is preferably made from a high tensile strength, corrosion resistant metal alloy. Particularly preferred metals are the corrosion resistant metal alloys comprising from about 0.5 to about 78 weight percent iron, from about 12 to about 25 weight percent chromium, and from 0 to about 80 weight percent nickel. Such corrosion resistant alloys may also contain trace amounts, e.g. less than 0.2 weight percent, of non-metals such as carbon, sulfur and silicon and may also contain manganese, molybdenum, cobalt or titanium, usually, but not always, in relatively low percentages, e.g. less than about 5 weight percent. Other metals such as corrosion resistant transition metals may also be present in low percentages, e.g. less than about 4 and usually less than about one percent. Commonly known names and trademarks for such corrosion resistant alloys are stainless steel, Inconel, Hastelloy, and Monel. Such corrosion resistant alloys generally have good corrosion resistance and high tensile strength, i.e. from about 70,000 pounds per square inch up to about 200,000 pounds per square inch or more. In severe corrosion situations, highly corrosion resistant metals may be used to form the ring, e.g. tantalum, palladium and palladium alloys with e.g. ruthenium and platinum, platinum and platinum alloys with e.g. iridium, rhodium, and ruthenium.

The metal ring may be formed by any suitable means, e.g. forging, casting or machining. In general, the size of the outside circumference of the metal ring is determined by the outside dimension of a flange to be sealed by the gasket; although, the metal ring may in fact have a diameter that is somewhat larger or smaller than the diameter of the flange to be sealed. The inside circumference of the ring, i.e. the circumference defining the size of the hole through the ring, is usually determined by the inside circumference of the flange to be sealed. The inside circumference of the flange defines the opening size through the flange. In practice, the inside circumference of the metal ring is often somewhat larger than the inside circumference of the flange to be sealed to permit space for a protective fluoropolymer shield, e.g. films or sheets, covering the metal ring, without requiring the shield to extend into the opening defined by the inside circumference of the flange to be sealed.

The "widely separated" parallel surfaces (faces) that define the maximum thickness of the ring are usually, but not always, separated by a distance of from about 0.5 to about 10 centimeters and the "narrowly separated" parallel surfaces (faces) that defined opposed depressed portions in the surface of the ring are usually, but not always, separated by from about 0.3 to about 8 centimeters. In any case, the separation of the narrowly separated parallel surfaces, is preferably no more than about 80 percent of the distance between the widely separated parallel surfaces.

The opposing shoulders that are perpendicular to and connect the widely separated parallel faces and narrowly separated parallel faces are preferably about equal in length and run the distance between the faces, i.e. each shoulder preferably has a length of one-half of the difference between the length of the distance between the widely separated faces and the narrowly separated faces. "Parallel" and "perpendicular" as used herein means essentially parallel and essentially perpendicular, i.e. there may be as much as about a five degree variation from parallel or perpendicular and further, transitional angles from parallel to perpendicular are understood to be permitted.

The reinforced fluoropolymer sheet material used to cover the outside faces of the metal ring, especially the widely separated outwardly directed parallel faces, may be any corrosion resistant high temperature fluoropolymer reinforced to provide dimensional stability, e.g. as described in U.S. Pat. No. 4,913,951 or German Patent DE 12 52 064. The fluoropolymer, e.g. Teflon, may be reinforced with any substance that will increase dimensional stability. Such reinforcing materials especially include metals, ceramics and glasses. The reinforcing material is preferably in the form of fibers. In general the preferred fluoropolymer sheet is reinforced with glass fiber since the glass fiber itself is corrosion resistant to most materials, is heat resistant, has good strength and is relatively inexpensive. The thickness of the sheet may vary but is usually from about 0.2 to about 2 centimeters in thickness.

A pair of unconnected sheets may be used to cover the widely separated parallel surfaces or a optionally, single sheet may be used that is formed and contoured, e.g. by molding or machining, to encase the widely separated parallel faces, the narrowly separated parallel faces and the inside circumference of the metal ring.

The O ring itself is preferably made of a resilient corrosion resistant plastic material, e.g. fluoropolymer such as polytetrafluoroethylene and has a thickness sufficient to permit it to at least partially extend up from the depressed portion of the metal ring and fluoropolymer sheet to extend beyond both the metal ring and fluoropolymer sheet such that when the gasket is compressed between the flange and a fitting mating with the flange, the O ring is compressed before the fluoropolymer sheet. The outside diameter of the O ring is such that its outside diameter rests against either the shoulder of metal ring or a shoulder in the surface of the fluoropolymer sheet formed as a result of the fluoropolymer sheet following the contour of the metal ring. The inside diameter of the O ring is large enough so that it does not protrude into the opening defined by the inside circumference of the flange.

Optionally, all portions of the gasket that may contact a flange surface, that may contact anything connected to the flange surface, e.g. a cover, and that may contact anything within the opening in the flange, e.g. corrosive materials, are cover by a contiguous fluoropolymer, e.g. polytetrafluoroethylene, shield. In other words, the fluoropolymer shield can cover most of the gasket structure, i.e. the widely separated parallel surfaces, the narrowly separated parallel surfaces, the interior circumference, the O rings and the one or more fluoropolymer sheets. The fluoropolymer shield thus provides even further protection from corrosive materials. The fluoropolymer shield may be of uniform thickness and follow the contour of the metal ring and the fluoropolymer sheets or may have a non-uniform thickness and reflect its own outside surface contour, e.g. shoulders, to help in retaining the O ring.

A better understanding of the invention may be had by reference to the drawings that are intended to illustrate, but not limit, the present invention.

A first embodiment of a gasket seal 10 of the invention is illustrated in FIG. 1 for sealing a glass lined flange 12 to a cover 14. As seen in FIG. 1, seal 10 comprises a metal ring 16 having inside circumference 18 and outside circumference 20. The ring further has widely separated parallel surfaces 22 and 24 defining a maximum thickness 26 of the ring 16 and by narrowly separated parallel surfaces 28 and 30 defining opposing depressed portions 32 and 34 in the ring 16. Ring 16 is further provided with opposing shoulders 36 and 38 that connect widely separated parallel faces 22 and 24 with narrowly separated parallel surfaces 28 and 30. The shoulders are essentially perpendicular to the parallel surfaces 22, 24, 28, and 30 and a have a surface 40 that faces the inside circumference 18 of metal ring 16. Each of the widely separated parallel faces 22 and 24 is covered by a reinforced polymer sheet 42 having inside surface 44 facing and covering widely separated surfaces 22 and 24 and having outside surface 46 facing outwardly toward flange 12 and cover 14.

The gasket is provided with O rings 48 and 50 each of which has an outside ring diameter 52 about equal to the diameter 52' of the shoulders 36 and 38. Each of O rings 48 and 50 are provided with a thickness sufficient to extend beyond the outside surface 46 of reinforced polymer sheet 42 when the gasket 10 is positioned within a depressed portion 32 or 34 and not compressed between a flange 12 and a cover 14 or other attachment to the flange 12.

Figure 2:
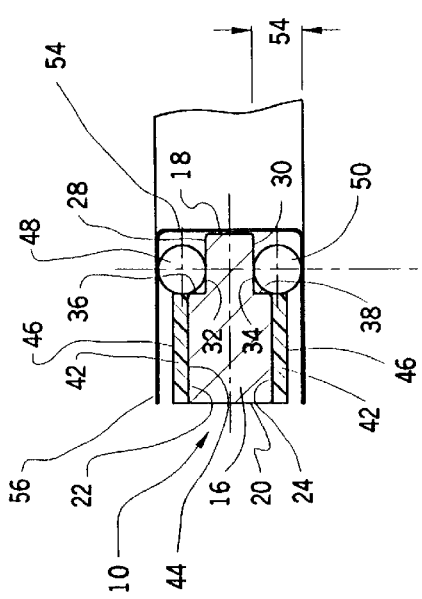
FIG. 2 shows an uncompressed embodiment of the stabilized O-ring gasket seal of the invention where the O-ring and reinforced PTFE back up sheets are covered by a PTFE shield.
Figure 3:
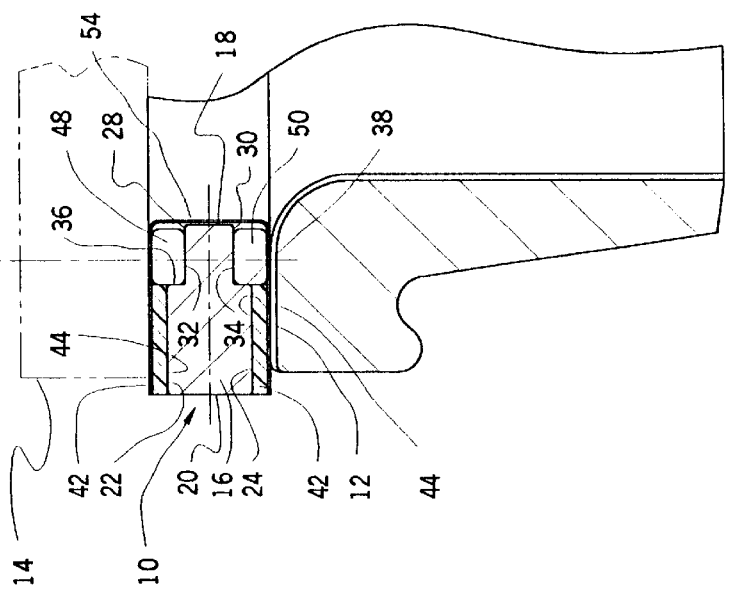
FIG. 3 shows the embodiment of FIG. 2 in a compressed state between a cover and glass lined flange.
Figure 4:
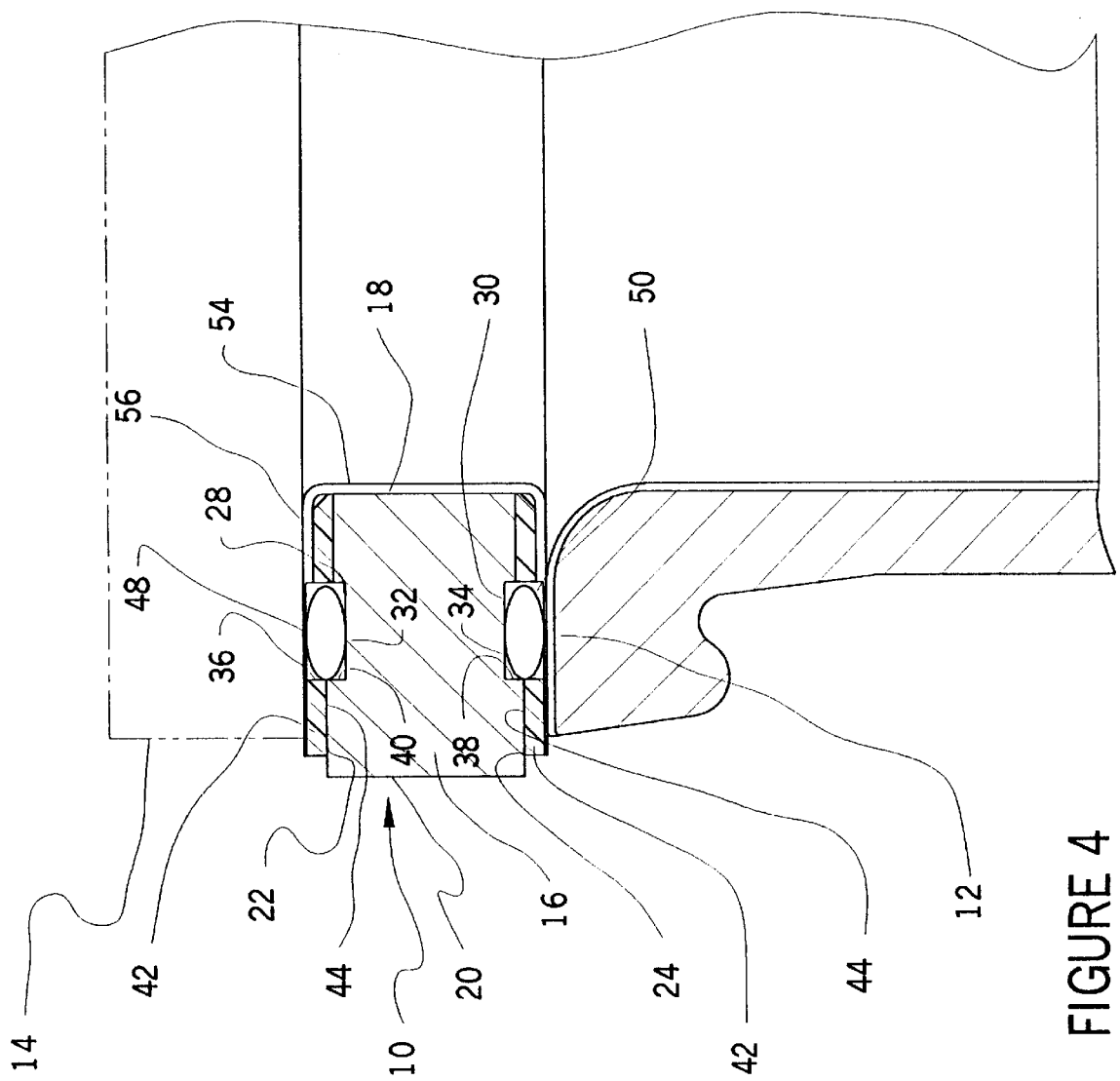
FIG. 4 shows a view of an O-ring gasket seal where the O rings rest in a depressed portions of the metal retaining ring and are further backed up on both sides by reinforced fluoropolymer sheets.
Figure 5:
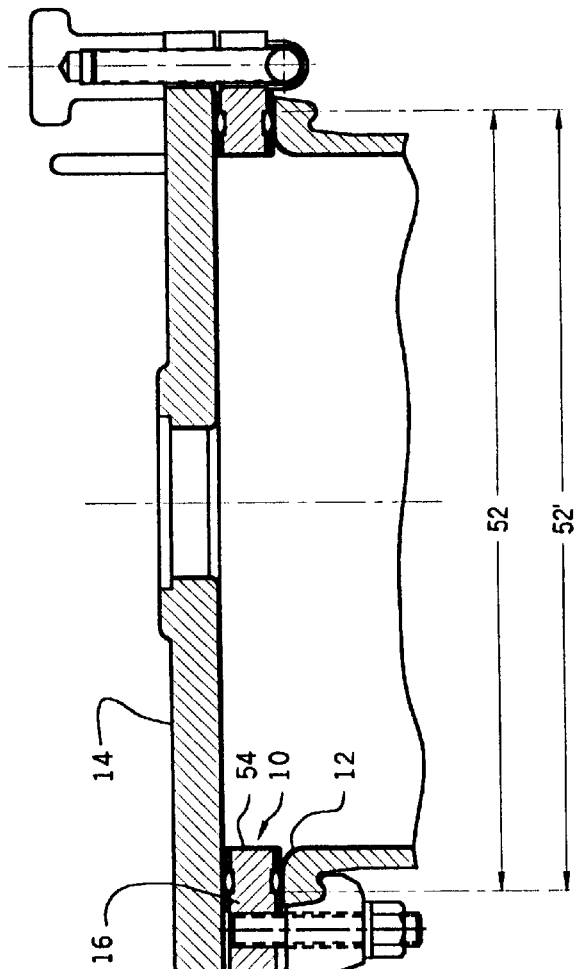
FIG. 5 shows an embodiment of a hinge type container cover sealed to a glass coated flange by means of a stabilized O-ring gasket seal of the invention as shown in FIG. 4.
Figure 6:
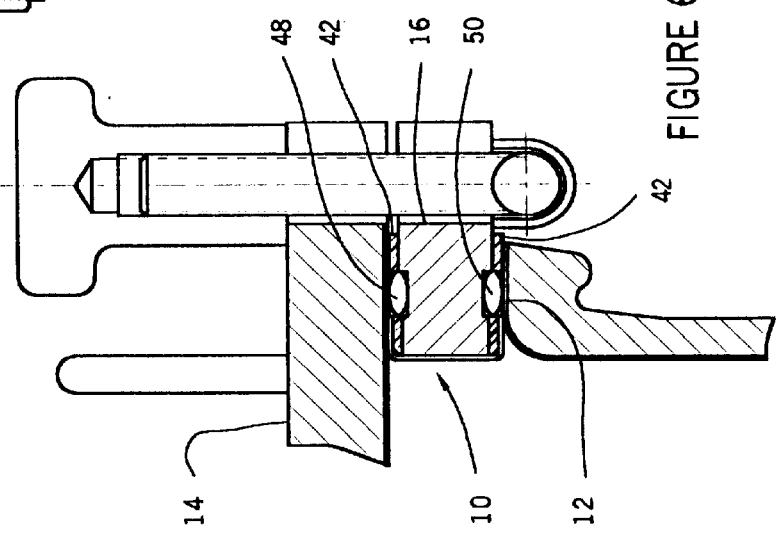
FIG. 6 shows a magnified view of a secured end portion of the cover of FIG. 5, showing a swing bolt connection.

The widely separated parallel faces 22 and 24, the interior (inside) circumference 18 and the outside surfaces 46 are covered with a fluoropolymer protective shield 54. The fluoropolymer shield 54 may at least partially follow a contour of depressed portions 32 and 34 so that the depressed portions 58 and 60 are also represented in outside surface 56 of shield 54. Such depressed portions thus permit O ring 48 to be placed at least partly within a combination of metal ring depressed portion 32 with shield depressed portion 58 and O ring 50 to be placed at least partly within a combination of metal ring depressed portion 34 with shield depressed portion 60. In such a configuration, O rings 48 and 50 are retained against radial blow out or deformation by shoulders 36 and 38. In the embodiments shown in FIGS. 2 and 3, the fluoropolymer protective shield also covers O rings 48 and 50. In that configuration, O rings 48 and 50 continue to be restrained against radial forces by shoulders 36 and 38.

What is claimed is:

1. A sealing gasket for sealing a flange face, said gasket comprising:
  a) a metal ring defined by inside and outside circumferences, by widely separated outwardly directed parallel surfaces defining the maximum thickness of the ring, narrowly separated parallel surfaces defining opposing depressed portions in the ring and by opposing shoulders each of which connects one of the widely separated parallel surfaces to one of the narrowly separated parallel surfaces, each shoulder being perpendicular to the parallel surfaces and having a surface that faces the inside circumference, each of said widely separated parallel surfaces being covered by at least one reinforced fluoropolymer sheet having inside and outside surfaces positioned so that the inside surface of the sheet is facing and covering at least one of the widely separated parallel surfaces and so that the outside surface faces outwardly;
  b) at least two O rings having outside diameters about equal to a diameter of the shoulder and having a thickness sufficient to extend beyond the outside surface of the reinforced fluoropolymer sheet when each O ring is positioned so that it is at least partly within one of the opposing depressed portions, so that the outside diameter of the O ring is proximate the face of the shoulder; and
  c) a fluoropolymer protective shield covering at least the outside surfaces of the at least one reinforced fluoropolymer sheet, the narrowly separated parallel surfaces of the metal ring and the inside circumference of the metal ring.

2. The sealing gasket of claim 1 wherein the fluoropolymer protective shield covers the narrowly separated parallel surfaces, so that depressed portions are present in the outside surface of the fluoropolymer sheet that at least partially follow a contour of the depressed portions in the metal ring and so that the O rings can be placed at least partly within the depressed portions of both the metal ring and fluoropolymer sheet.

3. The sealing gasket of claim 2 wherein the reinforced fluoropolymer sheet is a fiberglass reinforced fluoropolymer sheet.

4. The gasket of claim 1 wherein two separate reinforced fluoropolymer sheets are provided one of which covers one of the widely separated surfaces and the other of which covers the other widely separated surface.

5. The sealing gasket of claim 4 where the widely separated parallel surfaces, the interior circumference, the O rings and the outside surfaces of the fluoropolymer sheets are covered by the fluoropolymer protective shield.

6. The sealing gasket of claim 5 wherein the reinforced fluoropolymer sheets are fiberglass reinforced fluoropolymer sheets.

7. The sealing gasket of claim 4 wherein the reinforced fluoropolymer sheets are fiberglass reinforced fluoropolymer sheets.

8. The sealing gasket of claim 1 where the widely separated parallel surfaces, the interior circumference, the O rings and the outside surface of the fluoropolymer sheet are covered by the fluoropolymer protective shield.

9. The sealing gasket of claim 4 wherein the reinforced fluoropolymer sheet is a fiberglass reinforced fluoropolymer sheet.

10. The sealing gasket of claim 8 wherein the fluoropolymer protective shield comprises polytetrafluoroethylene.

11. The sealing gasket of claim 1 wherein the reinforced fluoropolymer sheet is a fiberglass reinforced fluoropolymer sheet.

12. The sealing gasket of claim 11 wherein the reinforced fluoropolymer sheet is a fiberglass reinforced fluoropolymer sheet.

13. The sealing gasket of claim 1, wherein the fluoropolymer protective shield comprises polytetrafluoroethylene.

14. The sealing gasket of claim 1 compressed between a glass coated flange and a glass coated flange cover.

* * * * *